United States Patent
Ramus et al.

(10) Patent No.: US 10,467,786 B2
(45) Date of Patent: Nov. 5, 2019

(54) SYSTEMS AND METHODS OF STENT IMAGE ENHANCEMENT

(71) Applicant: General Electric Company, Schenectady, NY (US)

(72) Inventors: Liliane Ramus, Buc (FR); Regis Vaillant, Buc (FR)

(73) Assignee: General Electric Company, Schenectady, NY (US)

(*) Notice: Subject to any disclaimer, the term of this patent is extended or adjusted under 35 U.S.C. 154(b) by 156 days.

(21) Appl. No.: 15/444,838

(22) Filed: Feb. 28, 2017

(65) Prior Publication Data

US 2018/0247406 A1 Aug. 30, 2018

(51) Int. Cl.
| | |
|---|---|
| G06K 9/00 | (2006.01) |
| G06T 11/60 | (2006.01) |
| G06T 7/00 | (2017.01) |
| G06T 5/00 | (2006.01) |
| G06T 5/50 | (2006.01) |

(52) U.S. Cl.
CPC .............. G06T 11/60 (2013.01); G06T 5/002 (2013.01); G06T 5/50 (2013.01); G06T 7/0012 (2013.01); G06T 7/0016 (2013.01); *G06T 2207/10016* (2013.01); *G06T 2207/10116* (2013.01); *G06T 2207/20182* (2013.01); *G06T 2207/20216* (2013.01); *G06T 2207/30101* (2013.01)

(58) Field of Classification Search
None
See application file for complete search history.

(56) References Cited

U.S. PATENT DOCUMENTS

| | | | | | |
|---|---|---|---|---|---|
| 5,771,895 | A | * | 6/1998 | Slager | A61B 5/02007 128/916 |
| 6,148,095 | A | * | 11/2000 | Prause | G06T 17/00 382/131 |
| 6,532,380 | B1 | * | 3/2003 | Close | A61B 6/481 382/128 |
| 7,415,169 | B2 | * | 8/2008 | Florent | G06T 5/50 382/130 |
| 7,734,328 | B2 | | 6/2010 | Vaillant et al. | |
| 8,515,527 | B2 | * | 8/2013 | Vaillant | G06T 7/73 600/407 |

(Continued)

OTHER PUBLICATIONS

Bismuth, Vincent, et al. "A comprehensive study of stent visualization enhancement in X-ray images by image processing means." Medical image analysis 15.4 (2011): 565-576. (Year: 2011).*

(Continued)

*Primary Examiner* — Samah A Beg
(74) *Attorney, Agent, or Firm* — Andrus Intellectual Property Law, LLP (57) ABSTRACT

Systems and methods of stent enhancement in medical images includes obtaining a plurality of medical images of a vessel and a stent. A centerline of the vessel is obtained in medical images of the plurality of medical images. A deformation field across the medical images of the plurality of medical images is estimated based at least in part upon the obtained centerlines. The medical images of the plurality of medical images are registered to a common reference image. The images are temporally integrated to obtain an enhanced visual representation of the stent.

20 Claims, 5 Drawing Sheets

(56) References Cited

U.S. PATENT DOCUMENTS

| | | | | |
|---|---|---|---|---|
| 9,532,754 B2* | 1/2017 | Sakaguchi | | G06T 7/11 |
| 2003/0199425 A1* | 10/2003 | Desai | | A61K 9/0019 |
| | | | | 424/489 |
| 2005/0058363 A1* | 3/2005 | Florent | | G06T 5/002 |
| | | | | 382/261 |
| 2005/0074158 A1* | 4/2005 | Kaufhold | | G06T 5/008 |
| | | | | 382/132 |
| 2007/0225792 A1* | 9/2007 | Granada | | A61F 2/958 |
| | | | | 623/1.11 |
| 2008/0125846 A1 | 5/2008 | Battle et al. | | |
| 2008/0154122 A1* | 6/2008 | Vaillant | | A61B 6/12 |
| | | | | 600/424 |
| 2010/0061611 A1* | 3/2010 | Xu | | G06T 19/00 |
| | | | | 382/131 |
| 2011/0064285 A1* | 3/2011 | Chen | | G06K 9/6206 |
| | | | | 382/128 |
| 2011/0228992 A1* | 9/2011 | Wels | | G06T 7/12 |
| | | | | 382/128 |
| 2012/0140998 A1* | 6/2012 | Zhu | | G06T 5/006 |
| | | | | 382/128 |
| 2013/0301897 A1* | 11/2013 | Zhu | | G06K 9/6207 |
| | | | | 382/132 |
| 2014/0270436 A1* | 9/2014 | Dascal | | G06T 7/11 |
| | | | | 382/130 |
| 2014/0276085 A1* | 9/2014 | Miller | | A61B 8/445 |
| | | | | 600/467 |
| 2015/0302578 A1* | 10/2015 | Grady | | G06T 7/0012 |
| | | | | 382/131 |
| 2015/0339847 A1* | 11/2015 | Benishti | | G16H 50/30 |
| | | | | 382/131 |
| 2016/0058407 A1* | 3/2016 | Wakai | | A61B 6/5217 |
| | | | | 382/103 |
| 2016/0317105 A1* | 11/2016 | Bismuth | | A61B 6/12 |
| 2017/0098302 A1* | 4/2017 | Peters | | A61B 5/0044 |
| 2017/0140532 A1* | 5/2017 | Dascal | | A61B 6/5247 |
| 2017/0213343 A1* | 7/2017 | Vaillant | | G06T 7/0028 |

OTHER PUBLICATIONS

Bismuth, Vincent, and Regis Vaillant. "Elastic registration for stent enhancement in x-ray image sequences." Image Processing, 2008. ICIP 2008. 15th IEEE International Conference on. IEEE, 2008. (Year: 2008).*

Boskamp, Tobias, et al. "New vessel analysis tool for morphometric quantification and visualization of vessels in CT and MR imaging data sets." Radiographics 24.1 (2004): 287-297. (Year: 2004).*

"Angioplasty and Vascular Stenting". RadiologyInfo.RSNA. Aug. 22, 2005, <https://www.radiologyinfo.org/en/info.cfm?pg=angioplasty>. (Year: 2005).*

* cited by examiner

SYSTEMS AND METHODS OF STENT IMAGE ENHANCEMENT

FIELD OF THE INVENTION

This disclosure relates generally to systems and methods of stent detection. More specifically, the present disclosure relates to enhancing an image of a stent in a medical image.

BACKGROUND OF THE INVENTION

A stent is a metal coil or mesh tube that can be placed within a lumen, which can be a blood vessel, in order to provide support and/or to keep the lumen open. Stents may be implemented to treat a variety of medical conditions, for example, an aneurysm which is the dilation of a blood vessel resulting in stretching of the vessel wall, or a stenosis which is a partial occlusion of a blood vessel.

A conventional procedure for placing a stent includes the following sequence of steps. A guidewire is initially inserted at the point of entry, which is usually a small percutaneous incision in the arm or groin, and is then transferred through one or more blood vessels to the target site (e.g., a site defined at or near the aneurysm or the stenosis). Thereafter a hollow generally cylindrical catheter is slipped over the guidewire and directed to the target site by following the guidewire. The stent is generally compressed or compacted in order to facilitate its navigation through the catheter to the target site. Thereafter, the stent is expanded to support a localized region of the vessel wall and/or to keep the vessel open.

The stent must be precisely positioned at a predetermined location within the blood vessel (e.g., at the dilation or occlusion) in order to most effectively treat the underlying medical condition. Stent is maneuvered by sliding along the guidewire. Stent placement precision is related to the accuracy with which it is placed with respect to the target site. Fluoroscopic or other radiographic imaging can be used to track and navigate the guidewire and other tools (e.g. catheter, balloon, stent) to the deployment location.

After the stent is deployed in the vessel, it is desirable to confirm proper stent position before deployment and completion of the surgical procedure. The clinician can then take corrective action, e.g. re-inflate the balloon. However, most often the deployed stent is barely visible in X-ray images and must be enhanced with image processing techniques. Typical stent enhancement techniques consist in combining several images of the stent after motion compensation. The small size of the stent struts present one challenge, but a greater challenge is compensating for the movement of and within the patient. Currently available motion compensation techniques rely on detecting, across several images, the radiopaque markerballs that are attached to the delivery balloon. The delivery balloon is held in position relative to the deployed stent and the markerballs used to estimate and compensate for the stent motion.

This approach is most suited for checking the stent right after the stent has been deployed, because the delivery balloon is still in the artery and positioned relative to the stent. However, if the clinician wants to check the deployment of a stent that was implanted during a previous intervention, which may have occurred days, months, or years ago, the clinician must insert a new balloon in the artery on purpose in order to position the balloon markerballs needed to perform stent enhancement. Additionally, in the case of intra-procedure use of the markerballs of the delivery balloon, marker-based motion compensation has known limitations, e.g. the markerballs may move with respect to the stent by sliding along the guidewire due to the blood flow or improper balloon anchoring.

BRIEF DISCLOSURE

An exemplary embodiment of a method of stent enhancement in medical images includes obtaining a plurality of medical images. The plurality of medical images is temporally successive images of a stented vessel. A centerline of the stented vessel in each medical image of the plurality of medical images is obtained. A deformation field across the plurality of images is estimated based at least in part upon the obtained centerline. The plurality of medical images is registered to a common reference image. The registered images are temporally integrated to obtain an enhanced visual representation of the stent.

An exemplary embodiment of a system for stent enhancement in medical images includes an x-ray emitter and an x-ray detector. The x-ray emitter and the x-ray detector are configured to obtain radiographic images. An imaging controller is operatively connected to the x-ray emitter and the x-ray detector. The imaging controller operates the x-ray emitter and the x-ray detector to acquire a plurality of temporally successive radiographic images of a portion of a patient in which a stent has been deployed. A computer receives the plurality of temporally successive radiographic images. The computer obtains a centerline of the stented vessel in each medical image of the plurality of medical images. The computer estimates a deformation field across the plurality of images based at least in part upon the obtained centerline. The computer registers the plurality of medical images to a common reference image. The computer temporally integrates the registered images to obtain an enhanced representation of the stent. A graphical display is communicatively connected to the computer and operable by the computer to visually present at least one of the radiographic images with an enhanced visual representation of the stent.

An exemplary embodiment of a method of stent deployment confirmation includes deploying a stent within a blood vessel of a patient. The deployment of the stent at least in part uses a balloon catheter. The balloon catheter is withdrawn from at least a portion of the blood vessel in which the stent was deployed. A plurality of medical images of a vicinity around the stent are acquired. A centerline of the blood vessel in each medical image of the plurality of medical images is estimated from a guidewire remaining within the blood vessel in the vicinity of the stent or from a dye injection. A deformation field across the plurality of images is estimated at least in part upon the estimated centerline. The plurality of medical images are registered to a common reference image. The registered images are temporally integrated to obtain an enhanced representation of the stent. At least one medical image with an enhanced depiction of the stent is visually presented on a graphical display.

BRIEF DESCRIPTION OF THE DRAWINGS

The present invention will be better understood from reading the following description of non-limiting embodiments, with reference to the attached drawings, wherein below.

DETAILED DISCLOSURE

Figure 1:
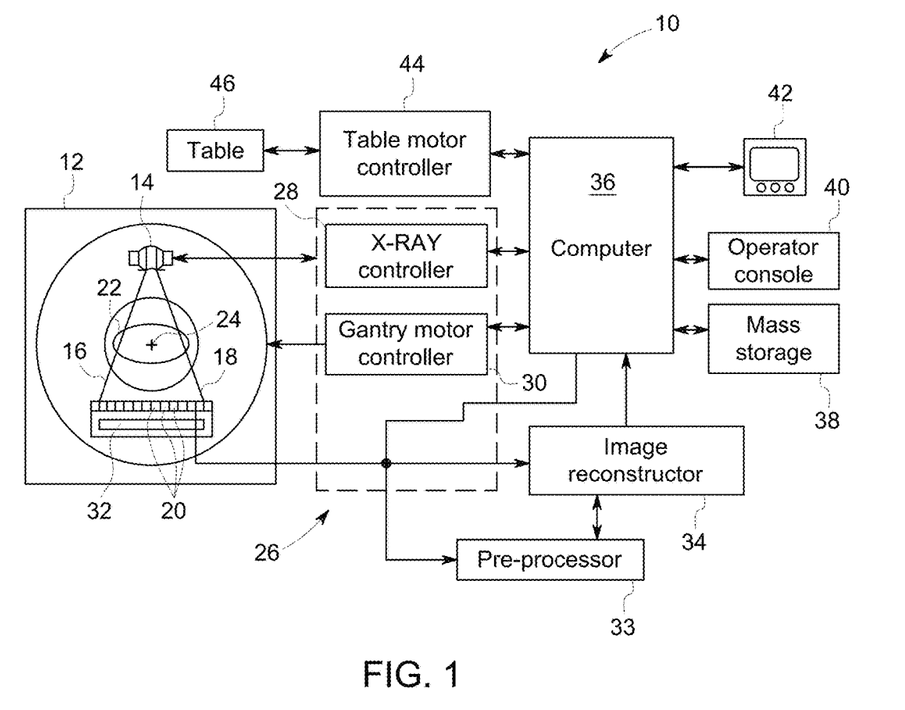
FIG. 1 is a block schematic diagram of an exemplary imaging system according to an embodiment of the invention.

The following description relates to various embodiments of medical imaging systems any of which may be suitably used in the planning, provision, and evaluation of stent placement. FIG. 1 depicts an exemplary embodiment of an imaging system 10 which may be used to obtain the medical images as described herein of the patient. Though an X-ray system is described by way of example, it should be understood that the present techniques may also be useful when applied to images acquired using other imaging modalities, including, but not limited to fluoroscopy and C-arm angiography.

Referring to FIG. 1, a medical imaging system 10 is shown that includes a gantry 12. Gantry 12 includes an x-ray source 14 that emits a beam of x-rays 16 toward detector array 18. In the embodiment depicted, the x-ray source 14 and the detector array 18 are both movable with the gantry 12, although it will be recognized that in other embodiments, one or the other of the x-ray source 14 or detector array 18 may be located at a fixed position during an imaging procedure. The x-rays pass through a subject 22, such as a patient, attenuating the x-rays. Each detector element 20 of detector array 18 may be a photon energy integrating detector, a photon counting detector, or a photon energy discriminating detector. Each detector element 20 produces an electrical signal that represents an intensity of the attenuated x-rays. Prior to or during an imaging process the gantry 12 may be movable to orient the x-ray source and/or x-ray detector at the region of interest in the patient.

The x-ray source 14 is operated by an imaging controller 26. The imaging controller 26 exemplarily includes an x-ray controller 28 that provides power and timing signals to x-ray source 14. The imaging controller 26 may further include a gantry motor controller 30 that controls movement and position of gantry 12. In some embodiments, gantry motor controller 30 may control a tilt angle of gantry 12. A data acquisition system (DAS) 32 in the imaging controller 26 samples and digitizes the image data from detector elements 20 and converts the image data to sampled and digitized image data for subsequent processing. In some embodiments, DAS 32 may be positioned adjacent to detector array 18 on gantry 12.

A computer 36 receives the image data from the detector elements 20 and is operable to process the image data as medical images and to further perform the stent enhancement as described in further detail herein. The computer 36 may be embodied in a processor that executes computer readable code to carry out the functions as described herein. As used herein, the term processor is not limited to just those integrated circuits referred to in the art as a processor, but broadly refers to a controller, a microcontroller, a microcomputer, a programmable logic controller, an application specific integrated circuit, and any other programmable circuit, and these terms are used interchangeably herein. The medical images, enhanced image data, and stent detection data can further be stored by the computer 36 to a mass storage device 38, the mass storage device 38 may include in non-limiting examples, a hard disk drive, a floppy disk drive, a compact disk-read/write (CD-R/W) drive, a Digital Versatile Disc (DVD) drive, a flash drive, and/or a solid-state storage device. An x-ray controller 28 adjusts a tube current within x-ray source 14 based on a quality of the reconstructed image.

Computer 36 also receives commands and inputs from a user, such as an operator, via a console 40 that includes a user interface device, such as a keyboard, mouse, voice-activated controller, touchscreen or any other suitable input apparatus. An associated display 42 allows a user, such as an operator, to observe the medical images, enhanced medical images, detected stent, and other data from computer 36. The image data and/or medical images or other data from the operation of the medical imaging system 10 may be stored in an Electronic Medical Record (EMR) and may also be entered by the operator of the machine.

The commands and inputs are used by computer 36 to provide control signals and information the imaging controller 26, including the DAS 32, x-ray controller 28, and gantry motor controller 30. In addition, computer 36 may operate a table motor controller 44 exemplarily of the imaging controller 26 which controls a motorized table 46 to position subject 22 relative to the gantry 12.

In embodiments, the computer 36 may additionally comprise all or part of the imaging controller 26, including, but not limited to the x-ray controller 28, gantry motor controller 30, DAS 32, and table motor controller 44. It will be recognized that these components may be implemented in one or more processors or controllers and perform the functions as described herein in coordination among such controllers or as modules or programs operating on a single computer or controller.

Figure 2:
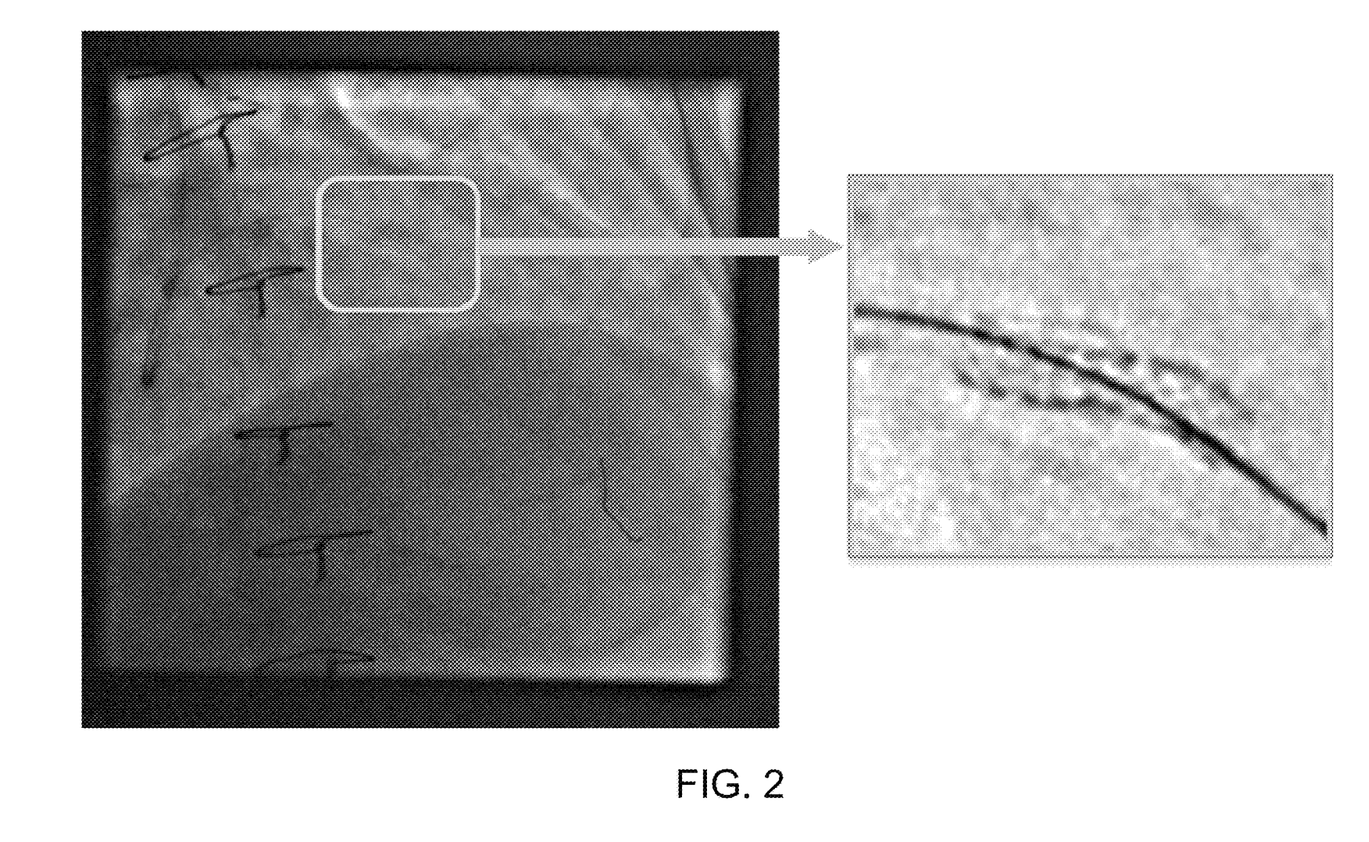
FIG. 2 depicts an exemplary embodiment of an enhanced stent image.

In a stenting procedure, the clinician needs to confirm that the stent has been properly placed and deployed. Additionally, a clinician may desire to check the position and condition of a stent that has been previously deployed in a prior stenting procedure. As depicted in FIG. 2, a stent is difficult to detect in a radiographic image 50, the stent 52 really only being visible in the magnified inset 54 of the stent 52 and the guidewire 56. As described in further detail herein, methods of stent enhancement may be used in conjunction with medical images, for example radiographic images.

Figure 3:
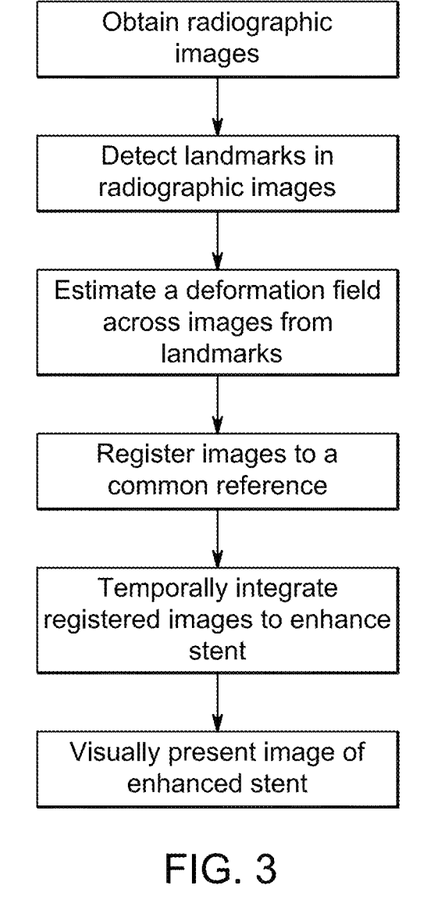
FIG. 3 is a flow chart that depicts an exemplary embodiment of a method of stent enhancement.

FIG. 3 depicts an exemplary embodiment of a method 100 of stent enhancement. In general, the embodiments of stent enhancement disclosed herein provide system and method solutions for stent enhancement and motion compensation that can be achieved without the need for referential balloon markerballs to be in position relative to the stent. By being able to provide stent enhancement without the referential provided by markerballs on a catheter balloon, surgical workflows can be improved and the need for insertion of a catheter balloon solely for referential purposes can be eliminated. Furthermore, it may potentially improve the visibility of the stent in the enhanced image as it is not affected anymore by the possible relative motion of the markerballs with respect to the stent.

The method 100 begins with obtaining radiographic images. The radiographic images obtained at 102 may have been previously acquired and stored, for example, at a patient's EMR. In other embodiments, the radiographic images may be presently acquired by a clinician, for example using the medical imaging system described above with respect to FIG. 1. In embodiments, the radiographic images are acquired with the patient under some treatment that improves the detection of the vessel itself. In one example, a guide wire is positioned within the vessel, while in another embodiment a radiopaque dye is injected into the patient prior to acquiring at least one of the radiographic images.

At 104, landmarks are detected within the radiographic images. In the case of a radiographic image with the guide wire, the guidewire is detected. In an embodiment wherein the vessel is filled with a radiographic dye, the vessel walls and vessel centerline are detected in the radiographic images.

At 106, a deformation field is estimated across images from the landmarks. As will be explained in further detail herein, this estimation is made by estimating the vessel centerline, for example, from the detected guide wire in a radiographic image that contains a guide wire in the vessel or from the vessel walls in embodiments wherein the vessel is treated with radiographic dye. With an estimation of the vessel centerline, the pixels of the acquired images are transformed to be represented by reference to the vessel centerline. With the vessel represented relative to the vessel centerline, the acquired radiographic images can all be registered to a common reference image at 108. This is performed by calculating the transformation parameters in the centerline related coordinate system according to a given image-based criteria.

At 110, with the images registered to a common reference, the images can be temporarily integrated to provide an enhanced representation of the stent.

At 112, the enhanced image of the stent is visually presented, for example on a graphical display of the medical imaging system 10 depicted in FIG. 1.

Figure 4:
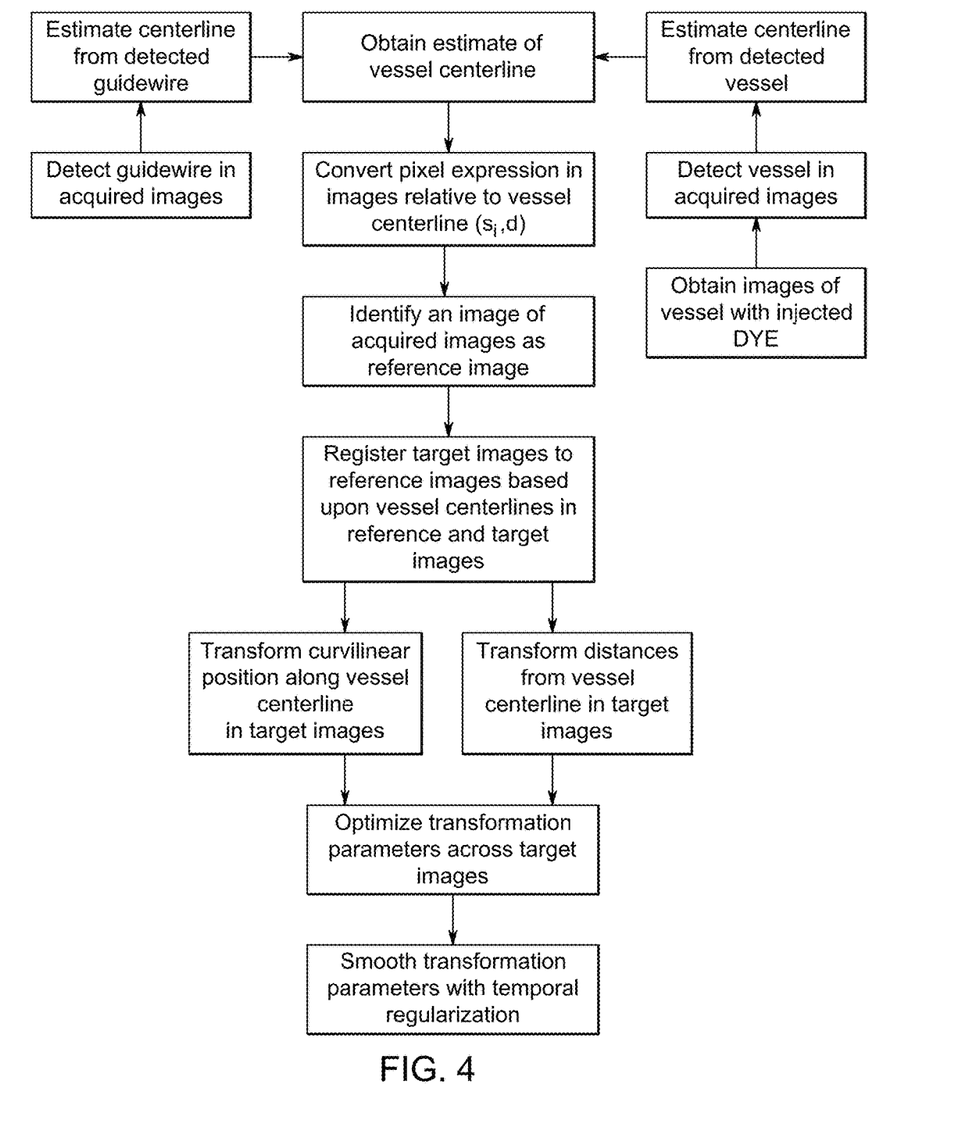
FIG. 4 is a flow chart that depicts a more detailed exemplary embodiment of a method of stent enhancement.

FIG. 4 is a flow chart that depicts an exemplary embodiment of a method 200 of enhancing a stent image. The method 200 is exemplarily a more detailed embodiment of the method 100 depicted in FIG. 3 and previously described. As depicted in FIG. 4, the acquired radiographic images may either be radiographic images of a stented vessel in which a guide wire is placed or radiographic images of a stented vessel in which the patient has been treated with radiographic dye. At 202, radiographic images of a vessel within which a guide wire is positioned are obtained. The radiographic images may be obtained by acquiring them with a medical imaging system or the radiographic images may be obtained by accessing stored radiographic images, for example, in an EMR associated with the patient.

At 204, the guide wire is detected using imaging processing techniques, for example, but not limited to curvilinear structure detection to identify the guidewire in the acquired images. At 206, a centerline of the vessel is estimated based upon at least the detected guidewire. In an exemplary embodiment, the detected guidewire is used as the estimated centerline of the vessel. In another exemplary embodiment, the detected guidewire is used in conjunction with detected walls of the vessel to estimate the centerline of the vessel.

Alternatively, as noted above, an embodiment may use an enhanced contrast agent, for example injection of radiographic dye, to better detect the vessel and estimate the vessel centerline. Prior to obtaining images of the vessel, the vessel is injected with radiographic dye at 208. With the radiographic dye injected into the vessel, at 210 the vessel is detected, particularly a cross section along a major visible axis of the vessel. The radiographic dye enables detection of the width of the vessel along with the vessels length.

From this enhanced detection of the blood vessel, a centerline of the vessel can be estimated at 212. In an exemplary embodiment, the centerline can be estimated directly from the detected vessel, exemplarily as a line equidistant from the edges of the detected vessel.

In either embodiment, at 214, the centerline of the stented vessel is obtained.

Figure 5:
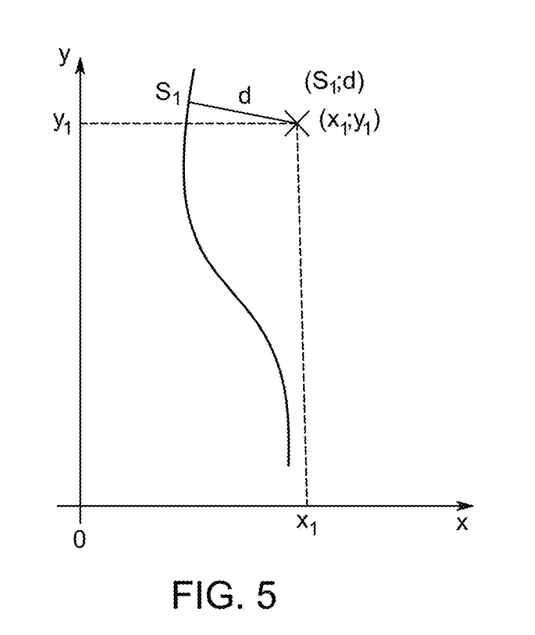
FIG. 5 depicts an exemplary embodiment of the stent coordinate system

Next, at 216, the obtained radiographic images of the stented vessel are converted to express the pixels in each of the images in a coordinate system relative to the vessel centerline. As depicted in FIG. 5, the radiographic images of the vessel typically represent each pixel in a xy coordinate system. Exemplarily, pixel 300 is represented as coordinate $x_1$, $y_1$ in the xy coordinate system. Rather, in the conversion at step 216, the pixel 300 is instead represented as a position along the centerline 302 and a distance from the centerline 302. This is exemplarily represented as $S_1$, $d_1$ in FIG. 5. In an exemplary embodiment, $S_1$ is the curvilinear abscissa along the estimated centerline and $d_1$ is the distance to the pixel at an angle normal to the estimated centerline. This conversion of the expression of the pixels in the radiographic images is applied to each of the plurality of radiographic images.

After the referential coordinate system for the pixels in the radiographic images has been converted, one image out of the plurality of radiographic images is identified at 218 as the reference image for the transformation and motion correction. The remaining images out of the plurality of radiographic images are exemplarily referred to as target images, the target images being transformed to be registered to the reference image.

At 220, the target images are registered to the reference image based upon the vessel centerline in each of the target images relative to the vessel centerline in the reference image. The registration of the target images at 220 can include one or both of transforming the positions along the centerline ($s_i$) representing the pixels in each of the target images, and the distances ($d_i$) from the centerline for each of the pixels in the target images at 224. In an exemplary embodiment, the model transformation used may exemplarily be an affine transformation on the curvilinear abscissa along the centerline and represented by equation 1:

$$s_i' = a \times s_i + b \qquad (1)$$

Figure 6:
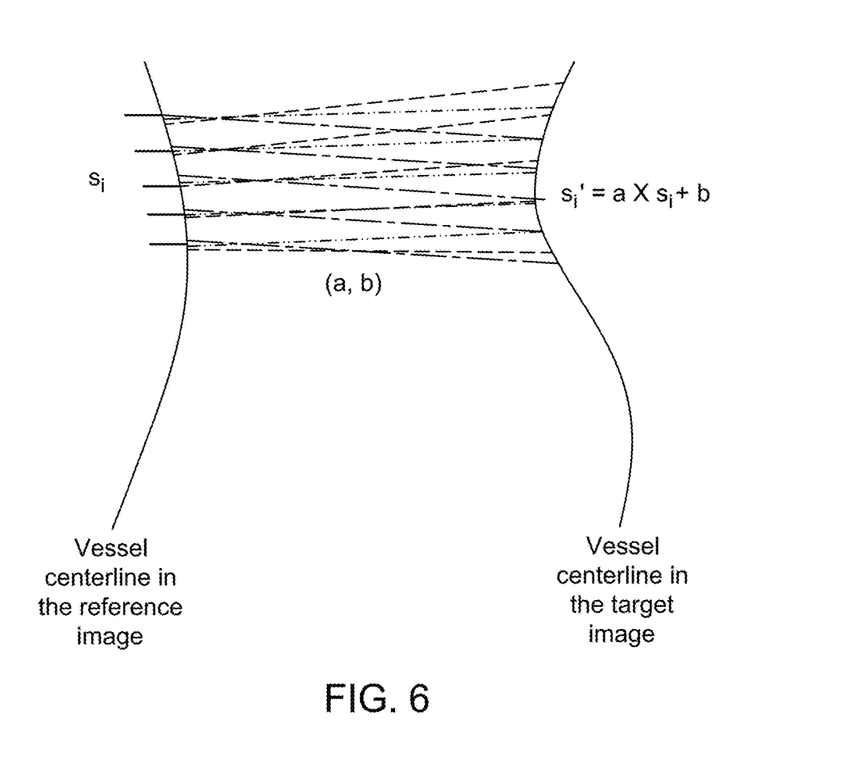
FIG. 6 depicts an exemplary relationship between a reference image and a target image.

This transformation for the position ($s_i$) along the centerline is exemplarily depicted in FIG. 6. For a given set of transformation parameters a,b, applying the transformation model of equation (1) to a pixel at position ($s_i$) along the centerline in the reference image allows to identify the corresponding pixel coordinate ($s_i'$) in the target image 306, and therefore to resample the target image onto the reference image according to the transformation parameters a,b. In this manner not only are each of the pixels in the radiographic images represented using curvilinear coordinates relative to a position along the vessel centerline, but also each of the pixels in the plurality of radiographic images are represented by reference to the centerline of the reference image according to a given set of transformation parameters a, b.

At 224, the transformation parameters (a,b) are calculated in an optimization function across the plurality of target images relative to the reference image. In an embodiment, for each target image, the transformation parameter set (a,b) is calculated to optimize a given similarity measure after resampling the radiographic target image onto the reference image. Alternatively, the set of transformation parameters for the plurality of target images can be optimized simultaneously using an image quality criteria (e.g. stent contrast or sharpness) on the final enhanced image obtained after temporal integration of all resampled target images. In an embodiment, transformation parameter pairs (a,b) are calculated for each target image across the plurality of radiographic images.

At 228, the transformation parameters across the plurality of radiographic images are smoothed with temporal regularization. As previously noted, the plurality of radiographic images are acquired in a temporal sequence, therefore any motion in the vessel and/or stent in the radiographic images is expected to be smooth in the temporal sequence of the plurality of radiographic images. The temporal regularization at 228 promotes smooth evolution of the transformation parameters along the temporal sequence. Therefore it can help to correct registration errors, thus improving signal to noise quality and/or visibility of the stent in the final enhanced image.

With temporal regularization and the registration of all of the target images to the reference image, motion correction within the set of radiographic images is achieved without the use of the balloon markerballs as an additional reference relative to the vessel and stent.

As described, embodiments of the systems and methods as disclosed herein improve workflow for a post treatment review of stenting procedures as a catheter balloon need not be positioned relative to the stent, only a more easily placed guidewire or radiographic dye injection. Intraprocedure imaging is improved as the catheter balloon does not need to be left in place for motion correction, therefore it may be removed sooner in the procedure, which contributes to minimize complication risks in particular in small distal vessels.

Additionally, embodiments of the systems and methods as described herein may improve signal to noise ratio in the enhanced images of the stent with improved motion correction. This facilitates clinician evaluation of stent deployment and placement. Additionally, the currently available techniques rely upon the markerballs on the catheter balloon susceptible to errors due to the movement of the balloon itself, relative to the stent during the radiographic imaging. Additionally, the placement of the balloon within the vessel in the region of the stent obstructs imaging of the stent and provides its own source of disturbance which can be eliminated through the use of systems and methods as described herein.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of stent enhancement in medical images, the method comprising:
   obtaining a plurality of medical images, wherein the plurality of medical images are temporally successive images of a vessel and a stent;
   obtaining a centerline of the vessel in medical images of the plurality of medical images by estimating the centerline of the vessel in the medical images without reference to image data in the medical images related to balloon markerballs positioned in the vessel;
   estimating a deformation field across the plurality of medical images based at least in part upon the obtained centerlines;
   registering the medical images to a common reference image; and
   temporally integrating the registered images to obtain an enhanced visual representation of the stent.

2. The method of claim 1, wherein estimating the centerline comprises identifying a guidewire in the vessel in medical images of the plurality of medical images without the use of any balloon markerballs located on the guidewire.

3. The method of claim 1, further comprising converting an expression of pixels in the medical images of the plurality of medical images into a curvilinear coordinates relative to the vessel centerline.

4. The method of claim 3, wherein the curvilinear coordinates each include a position along the vessel centerline and a distance from the vessel centerline.

5. The method of claim 4, further comprising:
   identifying one image of the plurality of images as the common reference image;
   identifying the remaining images of the plurality of images as target images; and
   registering the target images to the reference image based upon the vessel centerline in the target images relative to the vessel centerline in the reference image.

6. The method of claim 5 further comprising transforming positions along the vessel centerline in each of the target images relative to the position along the vessel centerline in the reference image.

7. The method of claim 5, further comprising transforming the distances from the vessel centerline in each of the target images relative to the distance in the reference image.

8. The method of claim 5, further comprising calculating the transformation parameters from the registration between each of the plurality of target images with the reference image.

9. The method of claim 8, further comprising smoothing the transformation parameters with temporal regularization.

10. The method of claim 1, wherein the medical images are radiographic images and further comprising acquiring radiographic images to obtain the plurality of medical images.

11. The method of claim 10, further comprising wherein at least one of the medical images of the plurality of medical images depicts the vessel treated with radiographic dye, and the centerline is further obtained by:
- detecting walls of the vessel treated with radiographic dye in the at least one medical image; and
- estimating the centerline from the detected walls in the at least one medical image of the vessel treated with radiographic dye.

12. The method of claim 1, further comprising visually presenting a medical image with an enhanced stent on a graphical display.

13. A system for stent enhancement in medical images, the system comprising:
- an x-ray emitter and an x-ray detector, configured to obtain radiographic images;
- an imaging controller operatively connected to the x-ray emitter and the x-ray detector and operates the x-ray emitter and the x-ray detector to acquire a plurality of temporally successive radiographic images of a portion of a patient including a vessel and a stent, but without image data of a balloon catheter or markerballs associated with the balloon catheter;
- a computer that receives the plurality of temporally successive radiographic images without image data of the balloon catheter or markerballs associated with the balloon catheter, the computer obtains a centerline of the vessel in each medical image of the plurality of medical images, estimates a deformation field across the plurality of images based at least in part upon the obtained centerline, registers the plurality of medical images to a common reference image and temporally integrates the registered images to obtain an enhanced visual representation of the stent; and
- a graphical display communicatively connected to the computer and operable by the computer to visually present at least one of the radiographic images with an enhanced visual representation of the stent.

14. The system of claim 13, wherein the computer converts an expression of pixels in the radiographic images of the plurality of radiographic images into a series of curvilinear coordinate pairs relative to the vessel centerline, each coordinate pair comprising a position along the vessel centerline and a distance from the vessel centerline.

15. The system of claim 14, wherein the computer further identifies one image of the plurality of images as the common reference image, identifies the remaining images of the plurality of images as target images and registers the target images to the reference image by transforming positions along the vessel centerline in each of the target images relative to the position along the vessel centerline in the reference image.

16. The system of claim 15, wherein the computer further registers the target images to the reference image by transforming the distances from the vessel centerline in each of the target images relative to the distance in the reference image.

17. The system of claim 13, wherein the computer further identifies a guidewire in the medical images in the vicinity of the stent and estimates the centerline of the stented vessel from the identified guidewire.

18. A method of stent deployment confirmation, the method comprising:
- deploying a stent within a vessel of a patient, using at least in part a balloon catheter comprising markerballs;
- withdrawing the balloon catheter from the vessel in which the stent was deployed;
- after withdrawing the balloon catheter from the vessel, acquiring a plurality of medical images of the vessel in which the stent was deployed;
- estimating a vessel centerline of the vessel in each medical image of the plurality of medical images from a guidewire remaining within the vessel in a vicinity of the stent, but without any markerballs located on the guidewire;
- estimating a deformation field across the plurality of images based at least in part upon the vessel centerline;
- registering the plurality of medical images to a common reference image; and
- temporally integrating the registered images to obtain an enhanced depiction of the stent; and
- visually presenting at least one medical image with an enhanced depiction of the stent.

19. The method of claim 18 further comprising:
- converting an expression of pixels in the medical images of the plurality of medical images into a series of curvilinear coordinate pairs relative to the vessel centerline, each coordinate pair comprising a position along the vessel centerline and a distance from the vessel centerline;
- identifying one image of the plurality of images as the common reference image;
- identifying the remaining images of the plurality of images being identified as target images;
- registering the target images to the reference image based upon the vessel centerlines in the target images relative to the vessel centerline in the reference image; and
- transforming positions along the vessel centerline in each of the target images relative to a position along the vessel centerline in the reference image.

20. The method of claim 18 further wherein estimating a vessel centerline of the vessel in the plurality of medical images is done so without reference to image data of a marker-ball of the balloon catheter withdrawn from the vessel in which the stent was deployed.

* * * * *